(12) United States Patent
Tanio et al.

(10) Patent No.: US 10,683,410 B2
(45) Date of Patent: Jun. 16, 2020

(54) RUBBER COMPOSITION, RUBBER ROLLER, AND IMAGE FORMING APPARATUS

(71) Applicant: SUMITOMO RUBBER INDUSTRIES, LTD., Hyogo (JP)

(72) Inventors: Yusuke Tanio, Hyogo (JP); Keisuke Osaka, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 51 days.

(21) Appl. No.: 16/172,891

(22) Filed: Oct. 29, 2018

(65) Prior Publication Data

US 2019/0225777 A1 Jul. 25, 2019

(30) Foreign Application Priority Data

Jan. 22, 2018 (JP) .................. 2018-008337

(51) Int. Cl.
| | |
|---|---|
| *C08L 9/02* | (2006.01) |
| *C08L 71/03* | (2006.01) |
| *C08J 9/10* | (2006.01) |
| *G03G 15/08* | (2006.01) |
| *C08K 3/04* | (2006.01) |
| *G03G 15/16* | (2006.01) |

(52) U.S. Cl.
CPC .............. *C08L 9/02* (2013.01); *C08J 9/103* (2013.01); *C08J 9/107* (2013.01); *C08K 3/04* (2013.01); *C08L 71/03* (2013.01); *G03G 15/0818* (2013.01); *G03G 15/1685* (2013.01); *C08J 2201/026* (2013.01); *C08J 2205/044* (2013.01); *G03G 2215/1614* (2013.01)

(58) Field of Classification Search
USPC ......................................................... 521/94
See application file for complete search history.

(56) References Cited

FOREIGN PATENT DOCUMENTS

| | | |
|---|---|---|
| JP | 2006259131 | 9/2006 |
| JP | 2013067722 | 4/2013 |

*Primary Examiner* — Terressa Boykin
(74) *Attorney, Agent, or Firm* — JCIPRNET

(57) ABSTRACT

A rubber composition capable of forming a foam such as a roller main body which has a low rubber hardness and is soft in a state in which an average cell diameter thereof is small is provided. The rubber composition includes NBR whose Mooney viscosity is 15 to 50 having a proportion being 10 parts by mass or more in 100 parts by mass of the total amount of rubber, epichlorohydrin rubber whose Mooney viscosity is 5 to 35 having a proportion being 10 parts by mass or more in 100 parts by mass of the total amount of rubber, and 10 parts by mass or less of carbon black and 7 parts by mass or less of a foaming agent with respect to 100 parts by mass of the total amount of rubber, and has a Mooney viscosity of 35 or less.

8 Claims, 1 Drawing Sheet

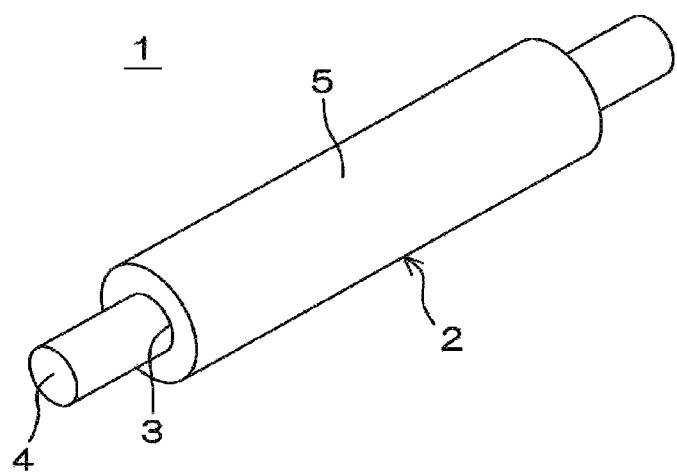

RUBBER COMPOSITION, RUBBER ROLLER, AND IMAGE FORMING APPARATUS

CROSS-REFERENCE TO RELATED APPLICATION

This application claims the priority of Japan patent application serial no. 2018-008337, filed on Jan. 22, 2018. The entirety of the above-mentioned patent application is hereby incorporated by reference herein and made a part of this specification.

BACKGROUND

Technical Field

The disclosure relates to a rubber composition, a rubber roller including a roller main body formed of a foam obtained by crosslinking and foaming the rubber composition, and an image forming apparatus having the rubber roller included therein.

Description of Related Art

For example, in image forming apparatuses using electrophotographic methods such as laser printers, electrostatic copying machines, plain paper facsimile machines, and multifunctional machines thereof, with the market maturation in recent years, higher image quality of formed images and higher image forming speeds tend to be required.

As a transfer roller serving as one of the components constituting an image forming apparatus, for example, a rubber roller including a conductive roller main body formed of a foam obtained by forming a rubber composition which includes rubber, a crosslinking component, a foaming component, and the like and has conductivity imparted thereto in a tubular shape and then foaming and crosslinking the rubber composition is used (Patent Document 1).

In this rubber roller, in order to satisfy the above-described requirements, an average value of cell diameters of foam cells exposed on an outer circumferential surface of a roller main body, that is, an average cell diameter, is required to be as small as possible (Patent Document 2). Furthermore, in the rubber roller, in order to satisfy the above-described requirements, the roller main body is also required to have a low rubber hardness and to be as soft as possible.

[Patent Document 1] Japanese Unexamined Patent Application Publication No. 2013-067722

[Patent Document 2] Japanese Unexamined Patent Application Publication No. 2006-259131

However, in the related art, there is a problem that it is difficult to achieve both a decrease in average cell diameter of a roller main body and softness of the roller main body. In other words, when attempting to reduce an average cell diameter of a foam, the rubber density of the roller main body increases and thus the rubber hardness increases, and on the other hand, in order to attempt to reduce rubber hardness, the average cell diameter needs be increased. For this reason, it can be said that the average cell diameter and the rubber hardness have a so-called trade-off relationship.

The disclosure provides a rubber composition capable of forming a foam such as a roller main body which has low rubber hardness and is soft in a state in which an average cell diameter thereof is small. Furthermore, an objective of the disclosure is to provide a rubber roller including a tubular roller main body formed of a foam obtained by foaming and crosslinking the rubber composition and an image forming apparatus including the rubber roller.

SUMMARY

The disclosure is a rubber composition which forms a foam used for an image forming apparatus using an electrophotographic method, in which at least acrylonitrile butadiene rubber whose Mooney viscosity ML (1+4) at 100° C. is 15 or more and 50 or less and epichlorohydrin rubber whose Mooney viscosity ML (1+4) at 100° C. is 5 or more and 35 or less are included as rubbers, a proportion of the acrylonitrile butadiene rubber included in 100 parts by mass of the total amount of rubber is 10 parts by mass or more, a proportion of the epichlorohydrin rubber included in 100 parts by mass of the total amount of rubber is 10 parts by mass or more, and 10 parts by mass or less of carbon black and 7 parts by mass or less of a foaming agent with respect to 100 parts by mass of the total amount of rubber are included, and whose Mooney viscosity ML (1+4) at 100° C. is 35 or less.

Also, the disclosure is a rubber roller including a tubular roller main body formed of a foam obtained by foaming and crosslinking the rubber composition.

In addition, the disclosure is an image forming apparatus including the rubber roller.

BRIEF DESCRIPTION OF THE DRAWINGS

FIG. 1 is a perspective view illustrating an example of an embodiment of a rubber roller according to the disclosure.

DESCRIPTION OF THE EMBODIMENTS

According to the disclosure, it is possible to provide a rubber composition capable of forming a foam such as a roller main body which has a low rubber hardness and is soft in a state in which an average cell diameter thereof is small. Furthermore, according to the disclosure, it is possible to provide a rubber roller including a tubular roller main body formed of a foam obtained by foaming and crosslinking the rubber composition and an image forming apparatus including the rubber roller.

《Rubber Composition》

As described above, the disclosure is a rubber composition which includes at least acrylonitrile butadiene rubber whose Mooney viscosity ML (1+4) at 100° C. is 15 or more and 50 or less (hereinafter abbreviated as "a low viscosity NBR" in some cases) and epichlorohydrin rubber whose Mooney viscosity ML (1+4) at 100° C. is 5 or more and 35 or less (hereinafter abbreviated as "a low viscosity epichlorohydrin rubber" in some cases) and in which a proportion of the acrylonitrile butadiene rubber and a proportion of the epichlorohydrin rubber included in 100 parts by mass of the total amount of rubbers are 10 parts by mass or more and 10 parts by mass or more, a carbon black is included at 10 parts by mass or less and a foaming agent is included at 7 parts by mass or less with respect to 100 parts by mass of the total amount of rubbers, and a Mooney viscosity ML (1+4) at 100° C. is 35 or less.

It should be noted that, in the following description, a Mooney viscosity ML (1+4) at 100° C. is simply abbreviated as "a Mooney viscosity" in some cases.

According to the disclosure, when the low viscosity NBR and the low viscosity epichlorohydrin rubber are used together at the predetermined proportion as rubber, the Mooney viscosity in the entire rubber composition is minimized to 35 or less and it is possible to promote escape of gas at the time of foaming.

For this reason, an average cell diameter of a foam can be minimized to a value smaller than in the related art while the blending ratio of the foaming agent is limited to that range.

Also, both of the low viscosity NBR and the low viscosity epichlorohydrin rubber basically have a smaller molecular weight than normal viscosity rubber whose Mooney viscosity exceeds the specific range. For this reason, when these rubbers are used together at the predetermined proportion, it is also possible to minimize an increase in rubber hardness of a foam while keeping the average cell diameter small in combination with the blending ratio of the carbon black as a reinforcing agent and a filler limited within the range.

Therefore, according to the rubber composition, it is possible to form a foam such as a roller main body which has a small average cell diameter and a low rubber hardness and is soft.

The reason why the Mooney viscosities of the low viscosity NBR, the low viscosity epichlorohydrin rubber, and the rubber composition are limited to the range and the blending ratios of these rubbers, the carbon black, and the foaming agent are limited to the range is as follows.

That is to say, since the viscosity of NBR having a Mooney viscosity of less than 15 is too low, it is not possible to foam the rubber composition satisfactorily or to form a foam having an appropriate strength. On the other hand, when only normal viscosity NBR whose Mooney viscosity exceeds 50 is used or the blending ratio of the low viscosity NBR is less than 10 parts by mass, the above-described effect of using the low viscosity NBR in combination with the low viscosity epichlorohydrin rubber cannot be obtained.

Likewise, since the viscosity of epichlorohydrin rubber having a Mooney viscosity of less than 5 is too low, it is not possible to foam the rubber composition satisfactorily or to form a foam having an appropriate strength. On the other hand, when only normal viscosity epichlorohydrin rubber whose Mooney viscosity exceeds 35 is used or the blending ratio of the low viscosity epichlorohydrin rubber is less than 10 parts by mass, the above-described effect of using the low viscosity NBR in combination with the low viscosity epichlorohydrin rubber cannot be obtained.

When a blending ratio of the carbon black exceeds 10 parts by mass, it is not possible to minimize an increase in rubber hardness of a foam even when the low viscosity NBR and the low viscosity epichlorohydrin rubber are used together at a predetermined proportion. Furthermore, when a blending ratio of the foaming agent exceeds 7 parts by mass, it is not possible to keep an average cell diameter of a foam small even when the low viscosity NBR and the low viscosity epichlorohydrin rubber are used together at a predetermined proportion.

In addition, when the Mooney viscosity of the rubber composition containing the above-described components exceeds 35, it is not possible to keep an average cell diameter of a foam small.

On the other hand, when the low viscosity NBR and the low viscosity epichlorohydrin rubber which have predetermined Mooney viscosities are used together with the carbon black and the foaming agent at predetermined ratios, it is possible to set the Mooney viscosity of the rubber composition to 35 or less. Moreover, it is possible to form a foam such as a roller main body which has a small average cell diameter and a low rubber hardness and is soft.

<NBRs>

NBRs function to impart good characteristics of rubbers, that is, good flexibility, low permanent compressive distortion, resistance to permanent setting, and the like to a foam such as a roller main body.

Examples of NBRs include any of low nitrile NBRs in which the content of acrylonitrile is 24% or less, medium nitrile NBRs in which the content of acrylonitrile is 25 to 30%, medium-high nitrile NBRs in which the content of acrylonitrile is 31 to 35%, high nitrile NBRs in which the content of acrylonitrile is 36 to 42%, and ultra-high nitrile NBRs in which the content of acrylonitrile is 43% or more.

Also, examples of NBRs include NBRs of an oil-extender type having an adjusted flexibility due to added extender oil and NBRs of a non-oil-extender type having no added extender oil, but in the disclosure, it is desirable to use NBRs of a non-oil-extender type which do not contain extender oil which can be a bleeding substance to prevent contamination of a photoreceptor or the like.

Among these NBRs, one or two or more NBRs having a Mooney viscosity ML (1+4) at 100° C. of 15 or more and 50 or less can be selected and used as the low viscosity NBR.

<Epichlorohydrin Rubber>

Epichlorohydrin rubber functions as ionic conductive rubber configured to impart ionic conductivity to a foam, and to adjust, in the case of, for example, a rubber roller, its roller resistance value within a range in which the rubber roller can be appropriately used as a transfer roller or the like.

Examples of epichlorohydrin rubber include one or two or more polymers such as epichlorohydrin homopolymers, epichlorohydrin-ethylene oxide bipolymers (ECOs), epichlorohydrin-propylene oxide bipolymers, epichlorohydrin-allyl glycidyl ether bipolymers, epichlorohydrin-ethylene oxide-allyl glycidyl ether terpolymers (GECOs), epichlorohydrin-propylene oxide-allyl glycidyl ether terpolymers, and epichlorohydrin-ethylene oxide-propylene oxide-allyl glycidyl ether tetrapolymers.

Among these, copolymers containing ethylene oxide, particularly ECO and/or GECO, are desirable.

The contents of ethylene oxide in ECO and/or GECO are preferably 30 mol % or more, and particularly preferably 50 mol % or more and preferably 80 mol % or less.

In the case of, for example, a rubber roller, ethylene oxide functions to decrease its roller resistance value. However, when the content of ethylene oxide is below this range, such a function cannot be sufficiently obtained. Thus, the roller resistance value cannot be sufficiently decreased in some cases.

On the other hand, when the content of ethylene oxide exceeds the above-described range, the crystallization of ethylene oxide is caused and a segment motion of a molecular chain is hindered. Thus, conversely, the roller resistance value tends to increase. Furthermore, the viscosity of the rubber composition before crosslinking increases at the time of heating and melting and thus the processability or the foamability of the rubber composition deteriorates or the roller main body or the like after the crosslinking is too hard in some cases.

The content of epichlorohydrin in an ECO is the remaining amount other than the content of ethylene oxide. In other words, the content of epichlorohydrin is preferably 20 mol % or more and preferably 70 mol % or less, and particularly preferably 50 mol % or less.

Also, the content of allyl glycidyl ether in a GECO is preferably 0.5 mol % or more, particularly preferably 2 mol % or more and preferably 10 mol % or less, and particularly preferably 5 mol % or less.

Allyl glycidyl ether itself functions to secure a free volume as a side chain, thereby minimizing the crystallization of ethylene oxide, and in the case of, for example, a rubber roller, reducing the roller resistance value of the rubber roller. However, when the content of allyl glycidyl ether is below this range, the roller resistance value of the rubber roller cannot be sufficiently decreased in some cases because such a function cannot be sufficiently obtained.

On the other hand, allyl glycidyl ether functions as a crosslinking point at the time of crosslinking a GECO. For this reason, when the content of allyl glycidyl ether exceeds the above-described range, a crosslink density of a GECO is too high and thus a segment motion of a molecular chain is hindered and the roller resistance value tends to increase.

The content of epichlorohydrin in a GECO is the remaining amount other than the content of ethylene oxide and the content of allyl glycidyl ether. In other words, the content of epichlorohydrin is preferably 10 mol % or more, particularly preferably 19.5 mol % or more and preferably 69.5 mol % or less, and particularly preferably 60 mol % or less.

As GECOs, modified copolymers obtained by modifying epichlorohydrin-ethylene oxide copolymers (ECOs) with allyl glycidyl ether are also known in addition to the copolymers in the narrow meaning in which the above-mentioned monomers of three types are copolymerized. In the disclosure, any of these GECOs can be used.

Among these epichlorohydrin rubbers, one or two or more epichlorohydrin rubbers whose Mooney viscosity ML (1+4) at 100° C. is 5 or more and 35 or less can be selected and used as the low viscosity epichlorohydrin rubber.

<Other Rubbers>

As rubbers, other rubbers may be used together with the low viscosity NBR and the low viscosity epichlorohydrin rubber.

Examples of other rubbers which may be used together with the low viscosity NBR and the low viscosity epichlorohydrin rubber include normal viscosity NBRs whose Mooney viscosity exceeds 50, natural rubbers, diene-based rubbers such as isoprene rubber (IR), styrene butadiene rubber (SBR), butadiene rubber (BR), and chloroprene rubber (CR), ethylene propylene-based rubbers such as ethylene propylene rubber (EPM), and ethylene propylene diene rubber (EPDM), and the like. Any of these rubbers function to impart the above-described good characteristics of rubbers to a foam such as a roller main body as in the low viscosity NBR.

Also, examples of other rubbers which may be used together with the low viscosity NBR and the low viscosity epichlorohydrin rubber include ionic conductive rubbers such as normal viscosity epichlorohydrin rubber whose Mooney viscosity exceeds 35 and polyether rubbers such as ethylene oxide-allyl glycidyl ether bipolymers and ethylene oxide-propylene oxide-allyl glycidyl ether tercopolymers. All of these ionic conductive rubbers function to impart ionic conductivity to a foam as in the low viscosity epichlorohydrin rubber, and in the case of, for example, a rubber roller, to adjust its roller resistance value within a range in which the rubber roller can be appropriately used for a transfer roller or the like.

One or two or more of these other rubbers can be used in combination with the low viscosity NBR and the low viscosity epichlorohydrin rubber.

Here, also in such a combined system, the blending ratios of the low viscosity NBR and the low viscosity epichlorohydrin rubber need to be 10 parts by mass or more in 100 parts by mass of the total amount of rubbers. The reason for this is as described above.

A blending ratio of the low viscosity NBR can be arbitrarily set within the above-described range in accordance with the blending ratios of the low viscosity epichlorohydrin rubber and other rubbers. An upper limit thereof is 90 parts by mass in a combined system with the low viscosity epichlorohydrin rubber without using other rubbers.

Likewise, a blending ratio of the low viscosity epichlorohydrin rubber can be arbitrarily set within the above-described range in accordance with the blending ratios of the low viscosity NBR and other rubbers. An upper limit thereof is 90 parts by mass in a combined system with the low viscosity NBR without using other rubbers.

Here, a blending ratio of the ionic conductive rubber containing at least the low viscosity epichlorohydrin rubber is preferably 40 parts by mass or more, particularly preferably 45 parts by mass and preferably 60 parts by mass or less, and particularly preferably 55 parts by mass or less in 100 parts by mass of the total amount of rubbers.

A blending ratio between a diene-based rubber containing at least the low viscosity NBR and/or an ethylene propylene-based rubber is the remaining amount other than the ionic conductive rubber. In other words, blending ratios of the diene-based rubber and the ethylene propylene-based rubber may be set so that the total amount of rubbers is 100 parts by mass when a blending ratio of the ionic conductive rubber is set to a predetermined value within the above-described range.

When a blending ratio of the ionic conductive rubber is below, or exceeds the above-described range, in either case, in the case of, for example, a rubber roller, its roller resistance value cannot be adjusted within a range in which the rubber roller can be appropriately used as a transfer roller or the like in some cases.

Furthermore, when a blending ratio of the ionic conductive rubber exceeds the above-described range, the proportions of the low viscosity NBR, the diene-based rubber, and the ethylene propylene-based rubber decrease relatively and thus the above-described good characteristics of rubbers cannot be imparted to a foam such as a roller main body in some cases.

On the other hand, when a blending ratio of the ionic conductive rubber is set to the above-described range, in the case of, for example, a rubber roller, it is possible to adjust its roller resistance value within a range in which the rubber roller can be appropriately used as a transfer roller. Furthermore, it is also possible to impart the above-described good characteristics of rubbers to a foam such as a roller main body.

<Crosslinking Component>

As crosslinking components, it is desirable to use crosslinking agents configured to crosslink rubber and crosslinking accelerators configured to promote the crosslinking of the rubber using the crosslinking agents together.

Among these, examples of crosslinking agents include sulfur-based crosslinking agents, thiourea-based crosslinking agents, triazine derivative-based crosslinking agents, peroxide-based crosslinking agents, various monomers, and the like. The crosslinking agents can be appropriately selected in accordance with a type of rubber to be combined.

For example, when rubbers are a combination of rubbers, all of which have a sulfur crosslinking property such as the low viscosity NBR and GECO in the low viscosity epichlorohydrin rubber (hereinafter abbreviated as "a low viscosity GECO" in some cases), a sulfur-based crosslinking agent may be used as a crosslinking agent.

Also, for example, in a case in which the low viscosity epichlorohydrin rubber is ECO which does not have a sulfur crosslinking property (hereinafter abbreviated as "a low viscosity ECO" in some cases) and the like, a thiourea-based crosslinking agent configured to crosslink the low viscosity ECO and a sulfur-based crosslinking agent may be used together as crosslinking agents.

(Sulfur-Based Crosslinking Agent)

Examples of sulfur-based crosslinking agents include sulfur such as powder sulfur, oil-treated powder sulfur, precipitated sulfur, colloidal sulfur, dispersible sulfur, organic sulfur-containing compounds such as tetramethylthiuram disulfide and N,N-dithiobismorpholine, and the like. Particularly, sulfur is desirable.

A blending ratio of sulfur is preferably 0.5 parts by mass or more and preferably 2 parts by mass or less with respect to 100 parts by mass of the total amount of rubbers in consideration of imparting the above-described good characteristics as rubber and the like to a foam such as a roller main body.

For example, when oil-treated powder sulfur, dispersible sulfur, or the like is used as sulfur, the blending ratio thereof is the proportion of sulfur itself as an active ingredient in each.

Also, when an organic sulfur-containing compound is used as a crosslinking agent, the blending ratio thereof is preferably set so that a proportion of sulfur included in a molecule with respect to 100 parts by mass of the total amount of rubbers falls within the above-described range.

(Crosslinking Accelerator)

Examples of a crosslinking accelerator configured to promote the crosslinking of rubber using a sulfur-based crosslinking agent include one or two or more types such as thiazole-based accelerators, thiuram-based accelerators, sulfonamide-based accelerators, and dithiocarbamate-based accelerators. Among these, it is desirable to use a thiuram-based accelerator and a thiazole-based accelerator together.

One or two or more types such as tetramethylthiuram monosulfide, tetramethylthiuram disulfide, tetraethylthiuram disulfide, tetrabutylthiuram disulfide, and dipentamethylenethiuram tetrasulfide can be exemplified as a thiuram-based accelerator.

Also, examples of thiazole-based accelerators include accelerators of one type or two or more types such as 2-mercaptobenzothiazole, di-2-benzothiazolyl disulfide, a zinc salt of 2-mercaptobenzothiazole, a cyclohexylamine salt of 2-mercaptobenzothiazole, and 2-(4'-morpholinodithio)benzothiazole.

A blending ratio of a thiuram-based accelerator is preferably 0.3 parts by mass or more and preferably 3 parts by mass or less with respect to 100 parts by mass of the total amount of rubbers in consideration of sufficiently manifesting the effect of promoting the crosslinking of the rubber using the sulfur-based crosslinking agents in the combination use system of the crosslinking accelerators of two types. Furthermore, a blending ratio of thiazole-based accelerator is preferably 0.3 parts by mass or more and preferably 2 parts by mass or less with respect to 100 parts by mass of the total amount of rubbers.

(Thiourea-Based Crosslinking Agent)

As thiourea-based crosslinking agents, various thiourea compounds having a thiourea structure in their molecules and capable of functioning as a crosslinking agent for ECO can be used. Examples of thiourea-based crosslinking agents include one or two or more types such as ethylene thiourea, N,N'-diphenyl thiourea, trimethyl thiourea, thiourea represented by the following Expression (1), and tetramethyl thiourea:

$$(C_nH_{2n+1}NH)_2C=2 \tag{1}$$

[where, n is an integer of 1 to 12]. Particularly, ethylene thiourea is desirable.

A blending ratio of a thiourea-based crosslinking agent is preferably 0.3 parts by mass or more and preferably 1 parts by mass or less with respect to 100 parts by mass of the total amount of rubbers in consideration of imparting the above-described good characteristics of rubber to a foam such as a roller main body or the like.

(Crosslinking Accelerator)

Various crosslinking accelerators which promote the crosslinking reaction of ECO using the thiourea-based crosslinking agent may be used in combination with the thiourea-based crosslinking agent. Examples of the crosslinking accelerator include guanidine-based accelerators of one or two or more types such as 1,3-diphenylguanidine, 1,3-di-o-tolylguanide, and 1-o-tolyl biguanide. Particularly, 1,3-di-o-tolylguanide is desirable.

A blending ratio of the crosslinking accelerator is preferably 0.3 parts by mass or more and 1 parts by mass or less with respect to 100 parts by mass of the total amount of rubbers in consideration of sufficiently exhibiting the effect of promoting the crosslinking reaction.

<Foaming Component>

As foaming components, various foaming agents capable of decomposing due to heating and generating a gas can be used. Furthermore, auxiliary foaming agents functioning to decrease a decomposition temperature of a foaming agent and promote its decomposition may be combined.

(Foaming Agent)

Examples of foaming agents include foaming agents of one type or two or more types such as azodicarbonamide (ADCA), 4,4'-oxybis(benzenesulfonylhydrazide) (OBSH), and N,N-dinitrosopentamethylenetetramine (DPT).

A blending ratio of the foaming agent is limited to 7 parts by mass or less with respect to 100 parts by mass of the total amount of rubbers as described above. The reason for this is as described above. Furthermore, a blending ratio of the foaming agent is preferably 1 parts by mass or more and preferably 5 parts by mass or less with respect to 100 parts by mass of the total amount of rubbers even in the above-described range.

(Auxiliary Foaming Agent)

As auxiliary foaming agents, various auxiliary foaming agents functioning to decrease decomposition temperatures of foaming agents to be combined and promote its decomposition can be used as described above. Examples of auxiliary foaming agents which can be combined with ADCA include urea ($H_2NCONH_2$)-based auxiliary foaming agents A blending ratio of an auxiliary foaming agent can be arbitrarily set in accordance with a type of foaming agent to be combined and is preferably 1 part by mass or more and preferably 5 parts by mass or less with respect to 100 parts by mass of the total amount of rubbers.

<Carbon Black>

As carbon black, any of various carbon blacks capable of functioning as a reinforcing agent for rubber can be used. Particularly, conductive carbon black is desirable. When conductive carbon black is used, it is also possible to impart electronic conductivity to a foam such as a roller main body.

As conductive carbon black, HAF is desirable. Since HAF can be uniformly dispersed in a rubber composition, it is possible to impart electron conductivity to a foam such as a roller main body as uniformly as possible.

A blending ratio of carbon black is limited to 10 parts by mass with respect to 100 parts by mass of the total amount of rubbers as described above. The reason for this is as described above. Furthermore, a blending ratio of carbon black is preferably 2 parts by mass or more with respect to 100 parts by mass of the total amount of rubbers in the above-described range.

(Others)

Various additives may be further blended with the rubber composition if necessary. Examples of additives include acid accepting agents, fillers other than carbon black, and the like.

Among these, acid accepting agents function to prevent a chlorine-based gas generated from epichlorohydrin rubber or the like at the time of crosslinking from remaining in, for example, a roller main body of a rubber roller and accordingly from causing crosslinking inhibition, contamination of the photoreceptor, and the like.

As acid accepting agents, various substances acting as acid acceptors can be used. In addition, among them, hydrotalcites and magsarat having excellent dispersibility are desirable and hydrotalcites are particularly desirable.

Also, when hydrotalcites or the like are used together with magnesium oxide or potassium oxide, it is possible to obtain a higher acid acceptance effect and to more reliably prevent the contamination of the photoreceptor or the like.

A blending ratio of an acid accepting agent is preferably 0.2 parts by mass or more, particularly preferably 0.5 parts by mass or more and preferably 5 parts by mass or less, and particularly preferably 2 parts by mass or less with respect to 100 parts by mass of the total amount of rubbers.

Examples of fillers include fillers of one type or two or more of types such as zinc oxide, silica, carbon black, talc, calcium carbonate, magnesium carbonate, and aluminum hydroxide.

Here, since carbon black is an essential component and the Mooney viscosity of the rubber composition is limited to 35 or less as described above in the disclosure, a blending ratio of another filler is preferably as small as possible, and it is particularly preferable that no other filler be blended in. Furthermore, when another filler is blended in, it is desirable to set the blending ratio of the other filler so that the total blending ratio of the carbon black and the other filler is 10 parts by mass or less as described above.

Also, as additives, various additives such as auxiliary crosslinking promotion agents, deterioration preventing agents, scorch preventing agents, plasticizers, lubricants, pigments, antistatic agents, flame retardants, neutralizing agents, nucleating agents, and co-crosslinking agents may be further blended at arbitrary ratios.

The rubber composition according to the disclosure can be appropriately used as a material for forming various members formed of a foam made of the rubber composition installed in an image forming apparatus using an electrophotographic method of laser printers, electrostatic copying machines, plain paper facsimile machines, multifunction machines thereof, and the like.

As the above-described member, particularly, the rubber roller such as the transfer roller may be exemplified as described above.

«Rubber Roller»

FIG. 1 is a perspective view illustrating an example of an embodiment of a rubber roller according to the disclosure.

Referring to FIG. 1, a rubber roller 1 in this example includes a roller main body 2 which is constituted of a foam with a rubber composition containing the above-described components, is porous, and is formed in a single-layer tubular shape and has a through hole 3 of the roller main body 2 at a center thereof through which a shaft 4 is inserted and fixed.

The shaft 4 is integrally formed of, for example, a metal such as aluminum, an aluminum alloy, or stainless steel.

For example, when the shaft 4 is electrically connected and mechanically fixed to the roller main body 2 with a conductive adhesive therebetween or the shaft 4 having an outer diameter larger than an inner diameter of the through hole 3 is press-fitted into the through hole 3, the shaft 4 is electrically joined and mechanically fixed to the roller main body 2.

<Manufacturing of Rubber Roller>

When the rubber roller 1 according to the disclosure is manufactured, first, a rubber composition constituted of the above-mentioned components is extrusion-molded in a tubular shape using an extrusion machine, is cut to have a predetermined length, and then is foamed and crosslinked by being subjected to pressurizing and heating using pressurized steam in a vulcanization can.

Subsequently, the foamed and crosslinked tubular body is heated using an oven or the like, is subjected to secondary crosslinking, is cooled, and then is polished to have a predetermined outer diameter to form the roller main body 2.

The shaft 4 can be inserted and fixed into the through hole 3 at an arbitrary time before the tubular body has been polished and after the tubular body has been cut.

Here, after the cutting, first, it is desirable to perform polishing and secondary crosslinking in a state in which the shaft 4 is inserted into the through hole 3. Thus, it is possible to minimize warpage, deformation, or the like of the tubular body due to the expansion and shrinkage during the secondary crosslinking. Furthermore, it is possible to improve the workability of polishing by performing the polishing while rotating about the shaft 4 and to minimize the variation of an outer circumferential surface 5.

As described above, the shaft 4 is inserted into the through hole 3 of the tubular body before the secondary crosslinking with a conductive adhesive, particularly a conductive thermosetting adhesive, therebetween and then the secondary crosslinking is performed or the shaft 4 having an outer diameter larger than a diameter of the through hole 3 may be press-fitted into the through hole 3.

In the former case, the tubular body is subjected to the secondary crosslinking through heating in the oven and at the same time the thermosetting adhesive is cured so that the shaft 4 is electrically joined and mechanically fixed to the roller main body 2. Furthermore, in the latter case, electrical joining and mechanical fixing are completed simultaneously with press-fitting. These two cases may be used together.

In the rubber roller 1 according to the disclosure manufactured through the above-described steps, in order to improve the image quality of a formed image, for example, when the rubber roller 1 is used as a transfer roller or the like, it is desirable that an average cell diameter of foam cells exposed on an outer circumferential surface 5 of the roller main body 2 through polishing be 220 µm or less. Furthermore, in order to improve the image quality of the formed image when the rubber roller 1 is used as a transfer roller or the like, it is desirable that the Asker C type hardness of a foam forming the roller main body 2 be 35 or less.

An average cell diameter of foam cells and Asker C type hardness of a foam are represented by values measured using the following methods.

<Average Cell Diameter of Foam Cells>

A cell diameter of each foam cell is obtained using the following Expression (2):

$$\text{Cell diameter (µm)} = (\text{long diameter} + \text{short diameter})/2 \qquad (2)$$

from a long diameter (μm) and a short diameter (μm) of foam cells included in the field of view of the outer circumferential surface 5 of the roller main body 2 observed with a microscope at a magnification of 200 times. Moreover, an average value of cell diameters of 30 foam cells in order from a foam cell having the largest cell diameter is calculated as an average cell diameter.

<Asker C Type Hardness>

For measurement, a Type C hardness tester (Asker Rubber Hardness Tester C type manufactured by KOBUNSHI KEIKI CO., LTD.) compliant with The Society of Rubber Industry, Japan Standard SRIS0101 "Physical testing methods for expanded rubber" applied in Annex 2 of Japanese Industrial Standard JIS K7312$_{-1996}$ "Physical testing methods for molded products of thermosetting polyurethane elastomers." is used.

Asker C type hardness is measured by pressing a pushing needle of the type C hardness tester against a central portion of the roller main body 2 in a state in which both ends of the shaft 4 inserted and fixed into the roller main body 2 are fixed to a support base and applying a load of 5 N (≈500 gf) to the pushing needle.

The Mooney viscosities of the NBR, the epichlorohydrin rubber, and the rubber composition are represented on the basis of values measured through the following method.

<Mooney Viscosity>

A Mooney viscosity is measured through a measurement method described in Japanese Industrial Standard JIS K6300-1$_{:2013}$ "Unvulcanized rubber—Physical properties—Part 1: Method of acquiring viscosity and scorch time using Mooney viscometer."

Note that all measurements are performed in an environment with a temperature of 23±3° C. and a relative humidity of 55±3%.

The rubber roller 1 according to the disclosure can be appropriately used as a transfer roller in, for example, the image forming apparatus using the electrophotographic method as described above. Here, the rubber roller 1 according to the disclosure can also be used as, for example, a charging roller, a developing roller, a cleaning roller, or the like.

«Image Forming Apparatus»

An image forming apparatus according to the disclosure is characterized by incorporating the rubber roller 1 according to the disclosure. As the image forming apparatus according to the disclosure, as described above, various image forming apparatuses using electrophotographic methods such as laser printers, electrostatic copying machines, plain paper facsimile machines, and multifunction machines thereof are exemplified.

EXAMPLES

The disclosure will be further described below on the basis of Examples and Comparative Examples, but the constitution of the disclosure is not necessarily limited to these Examples and Comparative Examples.

Example 1

(Rubber Composition)

As rubbers, 50 parts by mass of a low viscosity NBR whose Mooney viscosity ML (1+4) at 100° C. is 32 [Nipol (registered trademark) DN401LL manufactured by ZEON CORPORATION, low nitrile NBR, and amount of bound acrylonitrile: 18.0% (center value), non-oil-extended] and 50 parts by mass of a low viscosity GECO whose Mooney viscosity ML (1+4) at 100° C. is 25 [HYDRIN (registered trademark) T3108XL manufactured by ZEON CORPORATION] were blended.

First, components other than a crosslinking component among components illustrated in Table 1 were added and kneaded while 100 parts by mass of the total amount of these rubbers were being masticated using a Banbury mixer, the crosslinking component was added and kneaded, and a rubber composition was prepared.

TABLE 1

| Component | Parts by mass |
| --- | --- |
| Foaming agent | 4.0 |
| Auxiliary foaming agent | 4.0 |
| Carbon black | 10.0 |
| Acid accepting agent | 1.5 |
| Crosslinking agent | 1.6 |
| Crosslinking accelerator DM | 1.6 |
| Crosslinking accelerator TS | 2.0 |

The components in Table 1 are as follows. The expression "parts by mass" is parts by mass with respect to 100 parts by mass of the total amount of rubbers.

Foaming agent: ADCA [Product Name PINIFOL AC #3 manufactured by EIWA CHEMICAL IND. CO.]

Auxiliary foaming agent: Urea-based auxiliary foaming agent [Product Name CELL PASTE 101 manufactured by EIWA CHEMICAL IND. CO., LTD.]

Filler: Carbon black HAF [Product Name SEAST 3 manufactured by Tokai Carbon Co., Ltd.]

Acid accepting agent: Hydrotalcites [DHT-4A-2 manufactured by Kyowa Chemical Industry Co., Ltd.]

Crosslinking agent: Powder sulfur [manufactured by Tsurumi Chemical Industry Co., Ltd.]

Crosslinking accelerator DM: Di-2-benzothiaxyl disulfide [Product Name SUNS1 NE MBTS manufactured by Shandong Shanxian Chemical Co. Ltd.]

Crosslinking accelerator TS: Tetramethylthiuram disulfide [SANCELER (registered trademark) TS manufactured by SANSHIN CHEMICAL INDUSTRY CO., LTD.]

(Rubber Roller)

The prepared rubber composition was supplied to an extrusion machine, extrusion-molded in a tubular shape having an outer diameter of φ10 mm and an inner diameter of φ3.0 mm, cut to have a predetermined length, and attached to a temporary shaft for crosslinking having an outer diameter of φ2.2 mm.

Subsequently, a tubular body was subjected to pressurizing and heating using pressurized steam in a vulcanization can at 120° C.*10 minutes and then at 160° C.*20 minutes, the tubular body was foamed using a gas generated due to the decomposition of the foaming agent, and the rubber was crosslinked.

Subsequently, the tubular body was reattached to the shaft 4 having an outer diameter of φ5 mm whose outer circumferential surface is coated with a conductive thermosetting adhesive, secondary-crosslinked by being subjected to heating at 160° C.*60 minutes in an oven, and electrically joined and mechanically fixed to the shaft 4 by curing the thermosetting adhesive.

Moreover, when both ends of the tubular body were shaped and then the outer circumferential surface 5 thereof was subjected to traverse grinding using a cylindrical grinding machine, the roller main body 2 was formed by finishing its outer diameter to φ12.5 mm (tolerance±0.1 mm) and the rubber roller 1 was prepared.

Example 2

A rubber composition was prepared in the same manner as in Example 1 except that a blending ratio of carbon black was 3 parts by mass with respect to 100 parts by mass of the total amount of rubbers and a rubber roller 1 was produced.

Example 3

A rubber composition was prepared in the same manner as in Example 1 except that 40 parts by mass of a normal viscosity NBR [Mooney viscosity ML (1+4) at 100° C.: of 56, JSR (registered trademark) N240S manufactured by JSR, medium nitrile NBR, content of acrylonitrile (center value): 26%, non-oil-extended] and 40 parts by mass of a normal viscosity GECO [Mooney viscosity ML (1+4) at 100° C.: of 45, HYDRINT3108 manufactured by ZEON CORPORATION] were blended with 10 parts by mass of the same low viscosity NBR and 10 parts by mass of the same low viscosity GECO as used in Example 1 and a rubber roller 1 was produced.

Example 4

A rubber composition was prepared in the same manner as in Comparative Example 3 except that a blending ratio of carbon black was 3 parts by mass with respect to 100 parts by mass of the total amount of rubbers and a rubber roller 1 was produced.

Comparative Example 1

A rubber composition was prepared in the same manner as in Example 1 except that a blending ratio of carbon black was 15 parts by mass with respect to 100 parts by mass of the total amount of rubbers and a rubber roller 1 was produced.

Comparative Example 2

A rubber composition was prepared in the same manner as in Example 1 except that 45 parts by mass of the same normal viscosity NBR and 45 parts by mass of the same normal viscosity GECO as used in Example 3 were blended with 5 parts by mass of the same low viscosity NBR and 5 parts by mass of the same low viscosity GECO as used in Example 1 and a blending ratio of carbon black was 3 parts by mass with respect to 100 parts by mass of the total amount of rubbers and a rubber roller 1 was produced.

Comparative Example 3

A rubber composition was prepared in the same manner as in Example 1 except that 50 parts by mass of the same normal viscosity NBR and 50 parts by mass of the same normal viscosity GECO as in Example 3 were blended and a rubber roller 1 was produced.

Comparative Example 4

A rubber composition was prepared in the same manner as in Example 3 except that a blending ratio of carbon black was 3 parts by mass with respect to 100 parts by mass of the total amount of rubbers and a rubber roller 1 was produced.

Comparative Example 5

A rubber composition was prepared in the same manner as in Example 1 except that a blending ratio of ADCA as a foaming agent was 10 parts by mass with respect to 100 parts by mass of the total amount of rubbers and a rubber roller 1 was produced. This corresponds to a reproduction of the embodiment of Patent Document 2.

<Measurement and Evaluation of Mooney Viscosity of Rubber Composition>

The viscosities of the rubber compositions prepared in the examples and the comparative examples were measured using the above-mentioned method. Moreover, the Mooney viscosity of the rubber composition which was 35 or less was evaluated to be good (○) and the Mooney viscosity of the rubber composition which exceeded 35 was evaluated to be poor (x).

<Measurement and Evaluation of Average Cell Diameter of Foam Cell>

Average cell diameters of foam cells of the rubber rollers 1 produced in the examples and the comparative examples exposed on the outer circumferential surface 5 of the roller main body 2 were obtained using the above-described method. Moreover, a rubber roller having an average cell diameter which was 220 μm or less was evaluated to be good (○) and a rubber roller having an average cell diameter which exceeded 220 μm was evaluated to be poor (x).

<Measurement and Evaluation of Rubber Hardness of Foam>

Asker C type hardness of foams of the rubber rollers 1 produced in the examples and the comparative examples which formed roller main bodies were measured using the above-described method. Moreover, a rubber roller 1 having Asker C type hardness which was 35 or less was evaluated to be good (○) and a rubber roller 1 having Ask C type hardness which exceeded 35 was evaluated to be poor (x).

The above-described results are illustrated in Tables 2 and 3.

TABLE 2

|  |  | Example 1 | Example 2 | Example 3 | Example 4 |
|---|---|---|---|---|---|
| Parts by mass | Low viscosity NBR | 50 | 50 | 10 | 10 |
|  | Normal viscosity NBR | — | — | 40 | 40 |
|  | Low viscosity GECO | 50 | 50 | 10 | 10 |
|  | Normal viscosity GECO | — | — | 40 | 40 |
|  | Carbon black | 10 | 3 | 10 | 3 |
|  | Foaming agent ADCA | 4 | 4 | 4 | 4 |
| Evaluation | Mooney viscosity | ○ | ○ | ○ | ○ |
|  | Average cell diameter | ○ | ○ | ○ | ○ |
|  | Rubber hardness | ○ | ○ | ○ | ○ |

TABLE 3

|  |  | Example 1 | Example 2 | Example 3 | Example 4 | Example 5 |
|---|---|---|---|---|---|---|
| Parts by mass | Low viscosity NBR | 50 | 5 | — | — | 50 |
|  | Normal viscosity NBR | — | 45 | 50 | 50 | — |
|  | Low viscosity GECO | 50 | 5 | — | — | 50 |
|  | Normal viscosity GECO | — | 45 | 50 | 50 | — |
|  | Carbon black | 15 | 3 | 10 | 3 | 10 |
|  | Foaming agent ADCA | 4 | 4 | 4 | 4 | 10 |

TABLE 3-continued

|  |  | Example 1 | Example 2 | Example 3 | Example 4 | Example 5 |
|---|---|---|---|---|---|---|
| Evaluation | Mooney viscosity | ○ | X | X | X | ○ |
|  | Average cell diameter | ○ | X | X | X | X |
|  | Rubber hardness | X | ○ | X | ○ | ○ |

It was found from the results of Examples 1 to 4 and Comparative Examples 1 to 5 illustrated in Tables 2 and 3 that by having:

at least the low viscosity NBR and the low viscosity GECO used as rubber and blending ratios of the low viscosity NBR and the low viscosity GECO were set to 10 parts by mass in 100 parts by mass of the total amount of rubber, 10 parts by mass or less of the carbon black with respect to 100 parts by mass of the total amount of rubber and 7 parts by mass or less of the foaming agent with respect to 100 parts by mass of the total amount of rubber, it was possible to form the rubber roller including the roller main body which had the low rubber hardness and was soft in a state in which the Mooney viscosity of the rubber composition was set to 35 or less and the average cell diameter thereof was small.

What is claimed is:

1. A rubber composition which forms a foam used for an image forming apparatus using an electrophotographic method, in which at least acrylonitrile butadiene rubber whose Mooney viscosity ML (1+4) at 100° C. is 15 or more and 50 or less and epichlorohydrin rubber whose Mooney viscosity ML (1+4) at 100° C. is 5 or more and 35 or less are included as rubbers, a proportion of the acrylonitrile butadiene rubber included in 100 parts by mass of a total amount of rubber is 10 parts by mass or more, a proportion of the epichlorohydrin rubber included in 100 parts by mass of the total amount of rubber is 10 parts by mass or more, and 10 parts by mass or less of carbon black and 7 parts by mass or less of a foaming agent with respect to 100 parts by mass of the total amount of rubber are included, and whose Mooney viscosity ML (1+4) at 100° C. is 35 or less.

2. A rubber roller comprising a tubular roller main body formed of a foam obtained by foaming and crosslinking the rubber composition according to claim 1.

3. The rubber roller according to claim 2, wherein, an average value of cell diameters of foam cells exposed on an outer circumferential surface of the roller main body is 220 μm or less.

4. The rubber roller according to claim 2, wherein the foam forming the roller main body has an Asker C type hardness of 35 or less.

5. An image forming apparatus comprising the rubber roller according to claim 2.

6. The rubber roller according to claim 3, wherein the foam forming the roller main body has an Asker C type hardness of 35 or less.

7. An image forming apparatus comprising the rubber roller according to claim 3.

8. An image forming apparatus comprising the rubber roller according to claim 4.

* * * * *